May 19, 1953  M. FRENKEL  2,639,140
VARIABLE RATE SPRING DEVICE
Filed Dec. 18, 1948  2 Sheets-Sheet 1

INVENTOR

Mayer Frenkel

May 19, 1953  M. FRENKEL  2,639,140
VARIABLE RATE SPRING DEVICE
Filed Dec. 18, 1948  2 Sheets-Sheet 2

INVENTOR
Meyer Frenkel

Patented May 19, 1953

2,639,140

UNITED STATES PATENT OFFICE 2,639,140

VARIABLE RATE SPRING DEVICE

Meyer Frenkel, London, England

Application December 18, 1948, Serial No. 66,127
In Great Britain December 24, 1947

7 Claims. (Cl. 267—1)

This invention relates to spring devices.

It is an object of this invention to provide devices giving a spring effect, the rate of which is adjustable according to requirements over a very wide range.

It is a further object of this invention to provide devices giving a spring effect, where adjustment of the device produces a continuously variable rate of said spring effect.

In devices according to this invention, the above objects are to be achieved with the aid of one and the same spring means in the said devices.

It is a third object of this invention, to provide devices giving a spring effect, the rate of which is adjustable according to requirements over a wide range, where during operation of the device the rate of the spring effect provided remains substantially constant.

It is a fourth object of this invention to provide devices giving a spring effect, the rate of which is adjustable according to requirements over a wide range, and where further during operation of the device the rate of the spring effect provided varies in a desired manner.

In other words, it is an object of this invention that, in combination with a construction according to this invention, a spring with a rate $k$ will be made to provide the effect of any other spring with any desired rate $k'$ (within very wide limits) acting in a desired direction.

Further, the construction to be given allows the rates of spring devices, as well as the forces exerted by them, to be adjusted with very great precision, this being a matter of some difficulty for direct acting springs, particularly as far as the rate is concerned, which cannot be directly influenced.

Further, any single spring in an apparatus requiring a large relative motion of the end of the spring, will not keep its rate constant without limitation, and a variation of the rate of the spring may occur which may be undesirable for the purpose in view. With a device according to this invention, apart from such a device enabling one to adjust it precisely to produce a spring effect with a desired rate in a desired direction, one may also adjust or design the device in such a way that such a chosen rate remains constant for any relative displacement of the members exerting the spring effect, or, alternatively, one may so adjust or design such a device, that the rate of the spring effect required varies as a desired function of the relative displacement of the two members of the device, which exert the required spring effect.

A spring device according to this invention essentially comprises the following parts:

At least two members, of which at least one is guided to move relative to the other one along a certain path, which members are to exert the desired spring effect, i. e. these members are in contact with, or mounted on parts of some other machinery or mechanism, on which the desired spring effect is to be exerted, or said members may be such parts of the machinery or mechanism, which is to be subject to the desired spring effect.

Further, the spring device will comprise at least one, or in most cases, a number of "spring means," which engage both said members, in ways to be described hereafter.

Further, such a device will comprise means for altering the configuration of these constructional parts, as described hereafter.

A "spring means" is intended to denote in this specification any guide-means comprising at least two component parts, and a mounting for one said part on the other permitting motion of the one part relative to the other only along a certain path, in combination with a spring having each of its ends connected to, or at least engaging, one of said parts of the guide-means, or such a guide-means in combination with a number of springs in parallel, or in any other arrangement giving a spring effect, one of the parts of said guide-means being connected to, or engaging, one end of the arrangement of springs, and the other part of the guide-means engaging the other end of the arrangement of springs. The expression "spring" is intended to include all kinds of apparatus giving a spring effect, such as, for example, oil springs, and the like. In most cases, the two parts of the guide-means will be guided to move relative to one another in a straight line, which in preferred constructions will coincide with the axis of the symmetry of the whole spring means.

In other words, a "spring means" is a spring or combination of springs, the ends of which are mounted so as to be capable of relative motion only along a certain path, the line of action of the spring means, preferably along the axis of symmetry of the springs, where any forces on the spring means normal to the line of action are taken up on the mounting, and do not affect the deflection of the spring (by bending its axis, or twisting it, or in other undesirable ways), and thus deflection of the spring-means only takes place under the forces directed along the line of action of the spring means.

A spring device according to this invention will have at least one, but in most cases a number of such spring means interposed between and engaging said two members, which are to exert the desired spring effect.

In order that the rate of the spring effect exerted by the device should differ from the rate of its constituent spring means, the line of action of the spring means must have some inclination to the path of the relative motion of the two members of the device.

The present invention provides, in a device acting with a spring effect, the combination of at least two members, of a first guide-means for permitting relative motion of said two members only along a straight line which is the line of action of said device, of a spring means comprising at least one spring and a secondary guide-means for permitting deflection of said spring only along a straight line which is the line of action of said spring means, of a first engagement means between said spring means and a first of said members for maintaining the line of action of said spring means at the same inclination to the line of action of said device during operation of said device, of a second engagement means between said spring means and a second of said members for effecting movable abutment of said spring means against an abutment surface on said second member, and of means connected to said first engagement means for adjusting the angle formed between the line of action of said spring means and the line of action of said device, to effect adjustment of the rate of the spring effect of said device.

One embodiment comprises, for example, a number $n_1$ of spring means, which have their axes symmetrically arranged and held about the axis containing the path of the relative motion of the two members of the device (which will hereafter be referred to as axis of symmetry of the device), by a first engagement means of said spring means with a first member, and the ends of the spring means, which are left free to move relative to a second of the members, abut on an abutment surface or on abutment surfaces on said second member, which are symmetrically shaped and disposed relative to the said axis of symmetry of the device.

For such a construction, as can be proved, if $a$ is the angle between the line of action of a spring means and the axis of symmetry of the whole device, (which angle, due to the symmetry, is the same for all spring means in the device), $\psi$ is the angle between the axis of symmetry of the device and the normal to the abutment surface at the point of contact between the movable end of said spring means and the abutment surface (or, between the part of the guide-means of the spring means and the abutment surface), then the rate $k'$ of the whole spring device is $$k' = n_1 . n_2 . k . \frac{\cos^2 \psi}{\cos^2 (\psi - \alpha)}$$

where $n_1$ is the number of spring means in the device, and $n_2.k$ is the rate of each spring means, where $n_2$ is the number of springs, each of rate $k$, which are arranged in parallel in the spring means.

This formula shows that, in order to make the rate $k'$ of the whole device adjustable according to requirements, constructional means have to be provided in the device to adjust or vary angle $\alpha$ in one kind of embodiment, to adjust or vary angle $\psi$ in another kind of embodiment, or to make both angles $\alpha$ and $\psi$ adjustable or variable.

Thus, a spring device according to this invention will, in one embodiment, comprise means for adjusting the angle $\alpha$, i. e. for angularly adjusting the line of action of the spring means relative to the axis of symmetry of the whole device, while maintaining a symmetrical disposition of the spring means (if more than one), and keeping the angle $\psi$ the same during adjustment of angle $\alpha$, which is achieved constructionally by providing a plane abutment surface of constant inclination to the axis of symmetry of the whole device.

In a second type of embodiment, angle $\alpha$ will not be adjustable, but the abutment surface or surfaces will be mounted to be angularly adjustable relatively to the axis of symmetry of the whole device, so that angle $\psi$ can be adjusted at will.

In further types of embodiments, the line of action of the spring means are angularly adjustable, and thereby the angle $\alpha$, while the corresponding motion of the end of the spring means on the abutment-surface will, due to the shape of the abutment surface, produce simultaneously a required adjustment of the angle $\psi$. In other such types of embodiment, both the inclination of the line of action of the spring means, and the inclination of the abutment surface of its ends, relative to the axis of symmetry of the whole device, are made adjustable at will by means of some suitable mounting.

If during operation of the device after some fixed adjustment has been set, it is required that the angle $\psi$ should remain constant, the abutment surface will be made flat. Alternatively, if during operation of the device the angle $\psi$ is to vary in any desired way, for example in order to produce a required variation of the rate $k'$ of the device during operation, or perhaps in order to make up for some unavoidable variation of the rate $k$ of the spring means itself, so that the $k'$ of the device remains constant during operation, the curve of the abutment surface will be designed to bring about these effects.

In connection with keeping the rate $k'$ of the device constant during operation, or with keeping its variation small, it will be seen from consideration of the formula $$\frac{Z'}{Z} = \frac{\cos (\psi - \alpha)}{\cos \psi}$$

where $z'$ denotes the movement of the members of the spring device relative to each other and $z$ the relative movement of the ends of the spring means, that the relative motion of the ends of the spring means is smaller than the relative motion of the members of the spring device, and that the ratio of these relative motions can also be varied, so that $z$ can be so small for a required $z'$ of the device as a whole, that the rate $k$ of a spring in the spring means only varies by a negligible amount.

The invention will now be described in some greater detail with reference to the accompanying examples, which represent only some out of many possible constructions within in the ambit of this invention.

Figure 1:
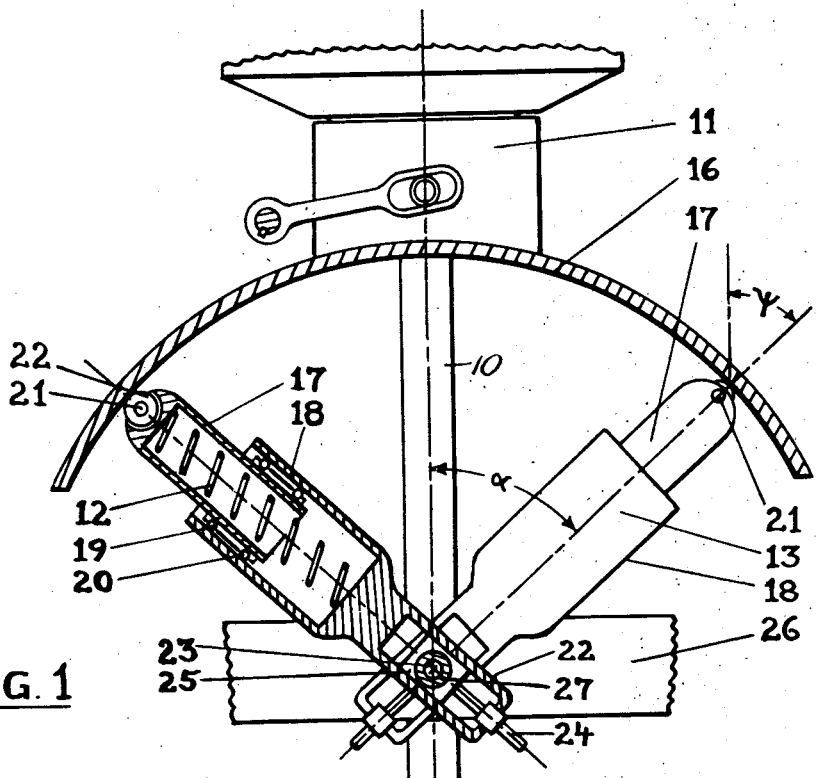
Fig. 1 is a sectional elevation of one embodiment of the invention.

Fig. 1 shows a sectional elevation of an embodiment of this invention in application to a governor mechanism. Here the governor sleeve 11, which is guided on the spindle 10, and the immovable part 26 of the governor housing, are the two members of the device, which are to exert the desired spring effect with the adjustable rate.

Two spring means are shown, denoted by reference 13, mounted on an axle 23 on fixture 26, and abutting at their other ends against a curved abutment surface 16 forming part of member 11. Although only two spring means 13 are shown, a corresponding pair of spring means on the other side of spindle 10 will be provided, in order to prevent skewing moments on the sleeve 11.

The spring means 13 comprise the spring 12, of rate $k$, enclosed in casings comprising 2 parts, 17 and 18, which fit into one another, and can slide apart and together with a minimum of frictional resistance on two ball races 19 and 20 provided between them, thus providing a spring means, in which all forces normal to the axis are taken up on the mounting comprising the two ball races, while relative motion of the two parts 17 and 18 only takes place along the line of action of the spring means under forces acting along this line of action.

The top of part 17, which abuts against surface 16, carries a roller 22 on pin 21, thus permitting relative motion between part 17 and the abutment surface 16 without appreciable frictional resistance.

The second part 18 of the guide-casing has a slotted end 22, in which a slide 25 is mounted, its exact position along the axis of the spring means being adjustable by means of screw 24. For one of the spring means 13, the slide 25 is non-rotatably mounted on axle 23, whereas for the opposite spring means 13 the slide 25 is non-rotatably mounted on a sleeve 27 on axle 23, as indicated on Fig. 3. Thus, rotation of the axle 23 and of the sleeve 27 respectively provides the adjustment of angle $\alpha$ between the axis (line of action) of the device and the lines of action of the spring means, which is required for adjustment of the rate of the spring effect of the device, while in ordinary operation these angles are maintained constant by the axle 23 and the sleeve 27 being held in any suitable way. This arrangement relating to the second part 18 of the guide-casing forms the "first engagement means" for maintaining the angle $\alpha$ constant during operation of the device, and, connected therewith, the adjustment means for varying this angle for any required adjustment of the rate of the spring effect of the device. This adjustment incidentally effect the adjustment of the angle $\psi$, the variation of which depends on the shape of the abutment surface 16.

In operation, for motion of the sleeve 11 relative to fixture 26 with rate $k'$, there is a corresponding motion of part 17 of each spring means relative to part 18 with rate $k$, and, as proved, for a device comprising 4 spring means 13, the rate $k'$ of the whole device is $$k' = 4.k. \frac{\cos^2 \psi}{\cos^2 (\psi \pm \alpha)}$$

i. e. the positive sign applies, when angles $\alpha$ and $\psi$ are measured in the opposite sense, and the negative sign applies, when $\alpha$ and $\psi$ are measured in the same sense.

In this embodiment, the rate $k'$ of the device varies with motion of sleeve 11, as for the curved abutment surface the angle $\psi$ is $f(z')$, $z'$ being the motion of sleeve 11 relative to fixture 26. As already stated, the variation of angle $\psi$ with $z'$ depends on the curve of the abutment surface 16, and angle $\psi$ can be made to vary in a way producing a desired variation of $k'$, or it can be made to make up for a variation of $k$, the rate of the spring means, during motion of the members.

Figure 2:
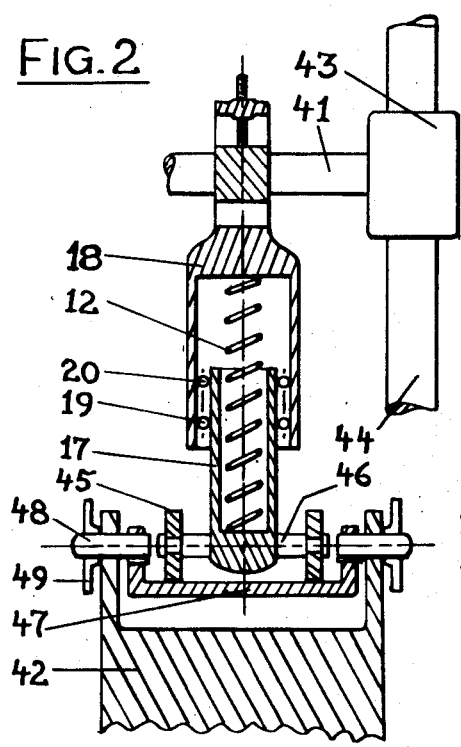
Figs. 3 and 2 are respectively a side-elevation, partly in section, and a section on line 2—2 of Fig. 3, of another embodiment of the invention.
Figure 3:
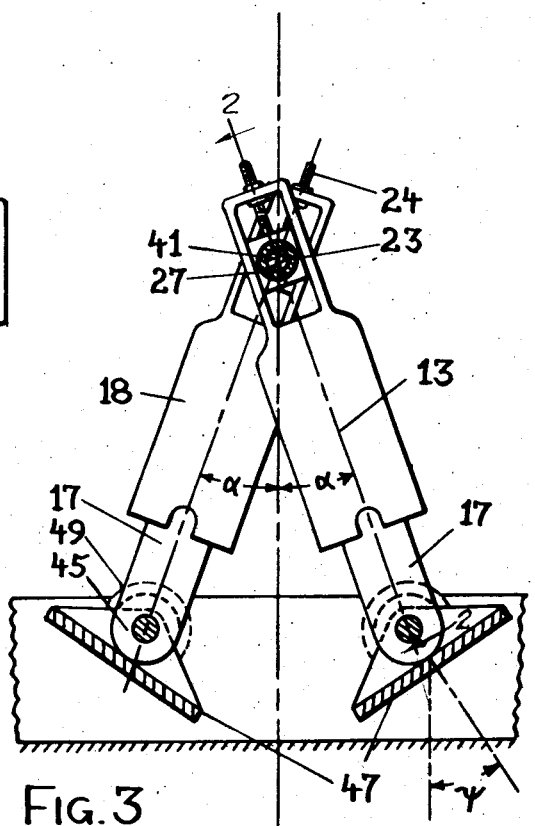

Figs. 2 and 3 show a further embodiment of the invention, also of the type in which one end of the spring means has relative motion to the abutment surface during operation of the device. In contrast to the construction described above, here angle $\psi$ remains constant during operation of the device, as well as angle $\alpha$, but both these angles are separately adjustable.

In this example, the two members, which are to exert the desired spring effect with adjustable rate $k'$, are the axle 41 and the fixture 42, of which axle 41 is the movable one, being guided by means of sleeve 43 on the rod or spindle 44. Here again, two spring means 13 are shown, but in most cases, for the sake of symmetry, as the two spring means are mounted on one axle, but not in the same plane, two groups of two spring means each. The spring means 13 are similar to those already described with reference to Fig. 1, like numerals denoting like parts, one spring means being mounted and keyed on the axle 41, and the second one on a sleeve 27 on axle 41, which is not shown in Fig. 2.

During operation, both the sleeve 27 and the inner axle 41 are prevented from rotation by means of some provision which is not shown in the drawing, thus maintaining the lines of action of the spring means 13 in the same inclinations about the axis of symmetry of the device, which also represents the path of the motion of axle 41 relative to fixture 42. For a change of adjustment of the rate of the spring effect of the device, both axle 41 and the sleeve 27 are rotated and then fixed in another angular position, thus providing other values of angle $\alpha$.

The spring means of this embodiment differ from those of the first one, in that the ends of parts 17 are provided with two rollers 45 each, on a small axle 46, the rollers engaging the plane abutment surfaces on abutment members 47. The abutment members are mounted on pins 48 in fixture 42, the pins 48 being provided with knobs 49 for altering the angular position of the abutment members, and thus the angle $\psi$.

During operation, as the rollers 45 roll on plane abutment surfaces, the angles $\psi$ remain constant, so that apart from possible changes in the rate $k$ of the springs in the spring means themselves, the rate $k'$ of the whole device is constant, being $$k' = n_1.k \frac{\cos^2 \psi}{\cos^2 (\psi \pm \alpha)}$$

as before, $n_1$ being the number of spring means in the device.

In an adjustment, when angle $\psi = \alpha$, the force from the abutment surface onto the part 17 of the guide-casing acts along the line of action of the spring means, and there are accordingly no bending moments on the spring means, to be taken up by the ball bearing mounting between parts 17 and 18. For this adjustment, $$k' = n_1 k \cos^2 \alpha$$

Figure 4:
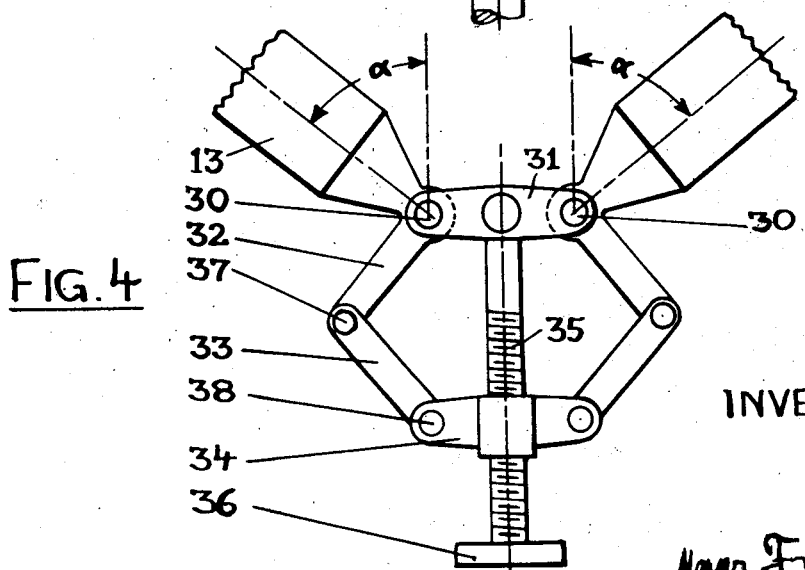
Fig. 4 is a side view of a means for varying the adjustment of the angle $\alpha$, which is applicable to both the illustrated embodiments as well as other forms of embodiments.

Fig. 4 shows a detail of a device for adjusting the angle $\alpha$ in any of the contructions already shown, or in similar constructions generally. The whole mechanism shown forms part of one of the members of the spring device, and the axes of two spring means 13 and the axis of symmetry of the whole device are arranged in one and the same plane, so that with such a mounting two spring means can be used in a device without producing any skewing moments. The mounting also provides for symmetrical adjustment of the angles α for the two spring means.

The spring means 13 are each mounted on a pin 30, and extending from their ends the arms 32, pins 30 forming part of bracket 31, which is fixed to one of the members of the device. Arms 32 are each pin-jointed to a link 33 at 37, which, in turn, are hinged at 38 to bracket 34. Bracket 34 is mounted on bracket 31 by means of screw-threaded rod 35, which is mounted in bracket 31 so as to be able to rotate about its axis, but to be incapable of axial motion. Rotation of knob 36 and thus of rod 35 will move bracket 34, and through the link mechanism adjust the angles α.

It will be understood that the above-described constructions are given by way of example only, and that many modifications, additions and omissions are possible without departing from the spirit of the invention.

I claim:

1. In a device acting with a spring-effect, the combination of at least two members, of a first guide-means for permitting relative motion of said two members only along a straight line which is the line of action of said device, of a spring means comprising at least one spring and a second guide-means for permitting deflection of said spring only along a straight line which is the line of action of said spring means, of a first engagement means between said spring means and a first of said members for maintaining the line of action of said spring means at the same inclination to the line of action of said device during operation of said device, of a second engagement means between said spring means and a second of said members for effecting movable abutment of said spring means against an abutment surface on said second member, and of means connected to said first engagement means for adjusting the angle formed between the line of action of said spring means and the line of action of said device to effect adjustment of the rate of the spring effect of said device.

2. In a device acting with a spring-effect, the combination as claimed in claim 1, in which said spring-means comprises said spring and said second guide-means for said spring, said second guide-means comprising at least two parts each of which engages one end of said spring, and a mounting for one of said parts on the other for permitting motion of one of said parts relative to the other along a straight line which is the line of action of said spring means.

3. In a device acting with a spring-effect, the combination as claimed in claim 1, in which said second engagement means between said spring-means and said second member comprises a roller mounted on said spring means, an abutment member for said roller, a mounting for said abutment member on said second member and means for adjusting the position of said abutment member, to vary the inclination of the normal to the contact area between said roller and said abutment member to the line of action of said spring device and thereby to adjust the rate of the spring effect of said device.

4. In a device acting with a spring-effect, the combination of at least two members, of a first guide-means for permitting relative motion of said two members only along a straight line which is the axis of said device, of a plurality of spring means each comprising at least one spring and a secondary guide-means for permitting deflection of said spring only along a straight line which is the line of action of said spring means, of a plurality of first engagement means between said spring means and a first of said members for maintaining the line of action of each of said spring means at the same inclination to the axis of said device during operation of said device and for maintaining a symmetrical disposition of said lines of action of the spring means about said axis of said device, of a plurality of second engagement means between said spring means and a second of said members for effecting movable abutment of said spring means against an abutment surface on said second member, and of means connected to said first engagement means for adjusting the angle formed between the line of action of each of said spring means and the axis of said device, to effect adjustment of the rate of the spring effect of said device.

5. In a device acting with a spring effect, the combination as claimed in claim 4, in which said spring means each comprise said spring and said secondary guide-means for said spring, said secondary guide-means comprising at least two parts each of which engages one end of said spring, and a mounting for one of said parts upon the other for permitting motion of one of said parts relative to the other only along a straight line which is the line of action of said spring means.

6. In a device acting with a spring effect, the combination as claimed in claim 4, in which said second engagement means between said spring means and said second member comprises a roller mounted on said spring means, an abutment member comprising said abutment surface for said roller, a mounting for said abutment member on said second member and means for adjusting the position of said abutment member relative to said second member, to vary the inclination of the normal to the contact area between said roller and said abutment member to the axis of said spring device, and thereby to adjust the rate of the spring effect of said device.

7. In a device acting with a spring effect, the combination as claimed in claim 4, in which said abutment surface on said second member is curved.

MEYER FRENKEL.

References Cited in the file of this patent

UNITED STATES PATENTS

| Number | Name | Date |
| --- | --- | --- |
| 392,760 | Romano | Nov. 13, 1888 |
| 1,037,949 | Mathiesen | Sept. 10, 1912 |
| 1,092,227 | Sherwood | Apr. 7, 1914 |
| 1,208,157 | Hien | Dec. 12, 1916 |
| 1,295,638 | Triggs | Feb. 25, 1919 |
| 1,466,817 | Dixon | Sept. 4, 1923 |
| 1,878,721 | Singer | Sept. 20, 1932 |
| 2,143,030 | Pym et al. | Jan. 10, 1939 |
| 2,184,341 | Ferris | Dec. 26, 1939 |
| 2,269,965 | Wemp | Jan. 13, 1942 |

FOREIGN PATENTS

| Number | Country | Date |
| --- | --- | --- |
| 27,150 of 1909 | Great Britain | Oct. 6, 1910 |
| 471,901 | Great Britain | Sept. 13, 1937 |